(12) United States Patent
Eck et al.

(10) Patent No.: US 9,864,744 B2
(45) Date of Patent: Jan. 9, 2018

(54) MINING MULTI-LINGUAL DATA

(71) Applicant: Facebook, Inc., Menlo Park, CA (US)

(72) Inventors: Matthias Gerhard Eck, Mountain View, CA (US); Ying Zhang, Turlock, CA (US); Yury Andreyevich Zemlyanskiy, San Francisco, CA (US); Alexander Waibel, Murrysville, PA (US)

(73) Assignee: Facebook, Inc., Menlo Park, CA (US)

( * ) Notice: Subject to any disclaimer, the term of this patent is extended or adjusted under 35 U.S.C. 154(b) by 289 days.

(21) Appl. No.: 14/559,540

(22) Filed: Dec. 3, 2014

(65) Prior Publication Data
US 2016/0162575 A1  Jun. 9, 2016

(51) Int. Cl.
*G06F 17/30* (2006.01)
*G06F 17/28* (2006.01)

(52) U.S. Cl.
CPC ........ *G06F 17/289* (2013.01); *G06F 17/2827* (2013.01); *G06F 17/2818* (2013.01); *G06F 17/30864* (2013.01)

(58) Field of Classification Search
CPC ... G06Q 10/04; G06F 17/2827; G06F 17/289; G06F 17/30864; G06F 17/2818
USPC ........... 707/748; 704/1, 2, 10; 706/46; 701/1
See application file for complete search history.

(56) References Cited

U.S. PATENT DOCUMENTS

| | | | |
|---|---|---|---|
| 5,293,581 A | 3/1994 | DiMarco et al. | |
| 5,477,451 A | 12/1995 | Brown et al. | |
| 5,510,981 A | 4/1996 | Berger et al. | |
| 5,799,193 A | 8/1998 | Sherman et al. | |
| 5,991,710 A | 11/1999 | Papineni et al. | |
| 6,002,998 A | 12/1999 | Martino et al. | |
| 6,157,905 A | 12/2000 | Powell | |
| 6,161,082 A | 12/2000 | Goldberg | |
| 6,223,150 B1 | 4/2001 | Duan et al. | |
| 6,266,642 B1 | 7/2001 | Franz et al. | |
| 6,304,841 B1 | 10/2001 | Berger et al. | |
| 6,377,925 B1 | 4/2002 | Newman et al. | |
| 6,393,389 B1 | 5/2002 | Chanod et al. | |
| 6,629,095 B1 * | 9/2003 | Wagstaff | G06F 17/30595 |
| 7,054,804 B2 | 5/2006 | Gonzales et al. | |
| 7,110,938 B1 | 9/2006 | Cheng et al. | |

(Continued)

OTHER PUBLICATIONS

Non-Final Office Action dated Dec. 21, 2016, for U.S. Appl. No. 14/586,022 of Huang, F., filed Dec. 30, 2014.

(Continued)

*Primary Examiner* — Frantz Coby
(74) *Attorney, Agent, or Firm* — Perkins Coie LLP

(57) ABSTRACT

Technology is disclosed for mining training data to create machine translation engines. Training data can be mined as translation pairs from single content items that contain multiple languages; multiple content items in different languages that are related to the same or similar target; or multiple content items that are generated by the same author in different languages. Locating content items can include identifying potential sources of translation pairs that fall into these categories and applying filtering techniques to quickly gather those that are good candidates for being actual translation pairs. When actual translation pairs are located, they can be used to retrain a machine translation engine as in-domain for social media content items.

19 Claims, 9 Drawing Sheets

(56) References Cited

U.S. PATENT DOCUMENTS

| | | |
|---|---|---|
| 7,359,861 B2 | 4/2008 | Lee et al. |
| 7,533,019 B1 | 5/2009 | Riccardi et al. |
| 7,664,629 B2 | 2/2010 | Dymetman et al. |
| 7,813,918 B2* | 10/2010 | Muslea ............... G06F 17/2827 704/1 |
| 7,827,026 B2 | 11/2010 | Brun et al. |
| 7,895,030 B2 | 2/2011 | Al-Onaizan et al. |
| 7,983,903 B2* | 7/2011 | Gao .................... G06F 17/2827 704/10 |
| 8,015,140 B2* | 9/2011 | Kumar .................. G06Q 10/04 706/46 |
| 8,145,484 B2 | 3/2012 | Zweig et al. |
| 8,175,244 B1 | 5/2012 | Frankel et al. |
| 8,204,739 B2 | 6/2012 | Lane et al. |
| 8,209,333 B2 | 6/2012 | Hubbard et al. |
| 8,265,923 B2* | 9/2012 | Chatterjee ........... G06F 17/2818 704/2 |
| 8,275,602 B2 | 9/2012 | Curry et al. |
| 8,386,235 B2 | 2/2013 | Duan et al. |
| 8,543,580 B2* | 9/2013 | Chen .................. G06F 17/30864 707/748 |
| 8,756,050 B1 | 6/2014 | Curtis et al. |
| 8,825,466 B1* | 9/2014 | Wang .................. G06F 17/2827 704/10 |
| 8,825,759 B1 | 9/2014 | Ho et al. |
| 8,831,928 B2* | 9/2014 | Marcu ................... G06F 17/289 701/1 |
| 8,838,434 B1 | 9/2014 | Liu |
| 8,874,429 B1 | 10/2014 | Crosley et al. |
| 8,897,423 B2 | 11/2014 | Nanjundaswamy |
| 8,935,150 B2 | 1/2015 | Christ |
| 8,942,973 B2 | 1/2015 | Viswanathan |
| 8,949,865 B1 | 2/2015 | Murugesan et al. |
| 8,983,974 B1 | 3/2015 | Ho et al. |
| 8,990,068 B2 | 3/2015 | Orsini |
| 8,996,352 B2 | 3/2015 | Orsini |
| 8,996,353 B2 | 3/2015 | Orsini |
| 8,996,355 B2 | 3/2015 | Orsini |
| 9,009,025 B1 | 4/2015 | Porter et al. |
| 9,031,829 B2 | 5/2015 | Leydon |
| 9,104,661 B1 | 8/2015 | Evans |
| 9,183,309 B2 | 11/2015 | Gupta |
| 9,231,898 B2 | 1/2016 | Orsini |
| 9,245,278 B2 | 1/2016 | Orsini |
| 9,336,206 B1 | 5/2016 | Orsini |
| 9,477,652 B2 | 10/2016 | Huang et al. |
| 9,734,142 B2 | 8/2017 | Huang |
| 9,734,143 B2 | 8/2017 | Rottmann et al. |
| 9,740,687 B2 | 8/2017 | Herdagdelen et al. |
| 9,747,283 B2 | 8/2017 | Rottmann et al. |
| 2002/0087301 A1 | 7/2002 | Jones et al. |
| 2002/0161579 A1 | 10/2002 | Saindon et al. |
| 2002/0169592 A1 | 11/2002 | Aityan |
| 2003/0040900 A1 | 2/2003 | D'Agostini et al. |
| 2004/0002848 A1 | 1/2004 | Zhou et al. |
| 2004/0049374 A1 | 3/2004 | Breslau et al. |
| 2004/0098247 A1 | 5/2004 | Moore |
| 2004/0122656 A1 | 6/2004 | Abir et al. |
| 2004/0243392 A1 | 12/2004 | Chino et al. |
| 2005/0021323 A1 | 1/2005 | Li et al. |
| 2005/0055630 A1 | 3/2005 | Scanlan et al. |
| 2005/0228640 A1 | 10/2005 | Aue et al. |
| 2006/0111891 A1 | 5/2006 | Menezes et al. |
| 2006/0206798 A1 | 9/2006 | Kohlmeier et al. |
| 2006/0271352 A1 | 11/2006 | Nikitin et al. |
| 2007/0130563 A1 | 6/2007 | Elgazzar et al. |
| 2007/0136222 A1 | 6/2007 | Horvitz et al. |
| 2008/0046231 A1 | 2/2008 | Laden et al. |
| 2008/0077384 A1 | 3/2008 | Agapi et al. |
| 2008/0281578 A1 | 11/2008 | Kumaran et al. |
| 2009/0070095 A1* | 3/2009 | Gao .................... G06F 17/2827 704/2 |
| 2009/0083023 A1 | 3/2009 | Foster et al. |
| 2009/0132233 A1 | 5/2009 | Etzioni et al. |
| 2009/0182547 A1* | 7/2009 | Niu ..................... G06F 17/2827 704/2 |
| 2009/0198487 A1 | 8/2009 | Wong et al. |
| 2009/0210214 A1 | 8/2009 | Qian et al. |
| 2009/0276206 A1 | 11/2009 | Fitzpatrick et al. |
| 2009/0281789 A1 | 11/2009 | Waibel et al. |
| 2009/0326912 A1 | 12/2009 | Ueffing et al. |
| 2010/0042928 A1 | 2/2010 | Rinearson et al. |
| 2010/0121639 A1 | 5/2010 | Zweig et al. |
| 2010/0149803 A1 | 6/2010 | Nakano et al. |
| 2010/0161642 A1* | 6/2010 | Chen ................. G06F 17/30864 707/759 |
| 2010/0194979 A1 | 8/2010 | Blumenschein et al. |
| 2010/0223048 A1 | 9/2010 | Lauder et al. |
| 2010/0228777 A1 | 9/2010 | Imig et al. |
| 2010/0241416 A1* | 9/2010 | Jiang .................. G06F 17/2827 704/7 |
| 2010/0283829 A1 | 11/2010 | De Beer et al. |
| 2010/0299132 A1* | 11/2010 | Dolan ................. G06F 17/2818 704/2 |
| 2011/0099000 A1 | 4/2011 | Rai et al. |
| 2011/0137636 A1 | 6/2011 | Srihari et al. |
| 2011/0246172 A1 | 10/2011 | Liberman et al. |
| 2011/0246881 A1 | 10/2011 | Kushman et al. |
| 2011/0252027 A1 | 10/2011 | Chen et al. |
| 2011/0282648 A1 | 11/2011 | Sarikaya et al. |
| 2012/0005224 A1 | 1/2012 | Ahrens et al. |
| 2012/0029910 A1 | 2/2012 | Medlock et al. |
| 2012/0035907 A1 | 2/2012 | Lebeau et al. |
| 2012/0035915 A1 | 2/2012 | Kitade et al. |
| 2012/0047172 A1* | 2/2012 | Ponte .................. G06F 17/3061 707/776 |
| 2012/0059653 A1 | 3/2012 | Adams et al. |
| 2012/0101804 A1 | 4/2012 | Roth et al. |
| 2012/0109649 A1 | 5/2012 | Talwar |
| 2012/0123765 A1 | 5/2012 | Estelle et al. |
| 2012/0130940 A1 | 5/2012 | Gattani et al. |
| 2012/0138211 A1* | 6/2012 | Barger ................... F16L 3/233 156/93 |
| 2012/0158621 A1 | 6/2012 | Bennett et al. |
| 2012/0173224 A1 | 7/2012 | Anisimovich et al. |
| 2012/0209588 A1 | 8/2012 | Wu et al. |
| 2012/0253785 A1 | 10/2012 | Hamid et al. |
| 2012/0330643 A1 | 12/2012 | Frei et al. |
| 2013/0018650 A1 | 1/2013 | Moore et al. |
| 2013/0060769 A1 | 3/2013 | Pereg et al. |
| 2013/0084976 A1 | 4/2013 | Kumaran et al. |
| 2013/0103384 A1 | 4/2013 | Hunter et al. |
| 2013/0144595 A1 | 6/2013 | Lord et al. |
| 2013/0144603 A1 | 6/2013 | Lord et al. |
| 2013/0144619 A1 | 6/2013 | Lord et al. |
| 2013/0173247 A1 | 7/2013 | Hodson et al. |
| 2013/0246063 A1 | 9/2013 | Teller et al. |
| 2013/0317808 A1 | 11/2013 | Kruel et al. |
| 2014/0006003 A1 | 1/2014 | Soricut et al. |
| 2014/0006929 A1 | 1/2014 | Swartz et al. |
| 2014/0012568 A1 | 1/2014 | Caskey et al. |
| 2014/0025734 A1 | 1/2014 | Griffin et al. |
| 2014/0059030 A1* | 2/2014 | Hakkani-Tur .... G06F 17/30663 707/706 |
| 2014/0081619 A1 | 3/2014 | Solntseva et al. |
| 2014/0108393 A1 | 4/2014 | Angwin et al. |
| 2014/0163977 A1 | 6/2014 | Hoffmeister et al. |
| 2014/0172413 A1 | 6/2014 | Cvijetic et al. |
| 2014/0195884 A1 | 7/2014 | Castelli et al. |
| 2014/0207439 A1 | 7/2014 | Venkatapathy et al. |
| 2014/0229155 A1 | 8/2014 | Leydon et al. |
| 2014/0279996 A1 | 9/2014 | Teevan et al. |
| 2014/0280295 A1 | 9/2014 | Kurochkin et al. |
| 2014/0280592 A1 | 9/2014 | Zafarani et al. |
| 2014/0288913 A1 | 9/2014 | Shen et al. |
| 2014/0288917 A1 | 9/2014 | Orsini et al. |
| 2014/0288918 A1 | 9/2014 | Orsini et al. |
| 2014/0303960 A1 | 10/2014 | Orsini et al. |
| 2014/0335483 A1 | 11/2014 | Buryak et al. |
| 2014/0337007 A1 | 11/2014 | Fuegen et al. |
| 2014/0337989 A1 | 11/2014 | Bojja et al. |
| 2014/0350916 A1 | 11/2014 | Jagpal et al. |
| 2014/0358519 A1 | 12/2014 | Dymetman et al. |

(56) References Cited

U.S. PATENT DOCUMENTS

| | | |
|---|---|---|
| 2014/0365200 A1 | 12/2014 | Sagie |
| 2014/0365460 A1 | 12/2014 | Portnoy et al. |
| 2015/0006143 A1 | 1/2015 | Skiba et al. |
| 2015/0006219 A1 | 1/2015 | Jose et al. |
| 2015/0033116 A1 | 1/2015 | Severdia et al. |
| 2015/0046146 A1 | 2/2015 | Crosley |
| 2015/0066805 A1 | 3/2015 | Taira et al. |
| 2015/0120290 A1 | 4/2015 | Shagalov |
| 2015/0134322 A1 | 5/2015 | Cuthbert et al. |
| 2015/0142420 A1 | 5/2015 | Sarikaya et al. |
| 2015/0161104 A1 | 6/2015 | Buryak et al. |
| 2015/0161110 A1 | 6/2015 | Salz |
| 2015/0161112 A1 | 6/2015 | Galvez et al. |
| 2015/0161114 A1 | 6/2015 | Buryak et al. |
| 2015/0161115 A1 | 6/2015 | Denero et al. |
| 2015/0161227 A1 | 6/2015 | Buryak et al. |
| 2015/0213008 A1 | 7/2015 | Orsini |
| 2015/0228279 A1 | 8/2015 | Moreno et al. |
| 2015/0293997 A1 | 10/2015 | Smith et al. |
| 2015/0363388 A1 | 12/2015 | Herdagdelen et al. |
| 2016/0041986 A1 | 2/2016 | Nguyen |
| 2016/0048505 A1 | 2/2016 | Tian et al. |
| 2016/0092603 A1 | 3/2016 | Rezaei et al. |
| 2016/0117628 A1 | 4/2016 | Brophy et al. |
| 2016/0162473 A1 | 6/2016 | Hedley et al. |
| 2016/0162477 A1 | 6/2016 | Orsini |
| 2016/0162478 A1 | 6/2016 | Blassin et al. |
| 2016/0177628 A1 | 6/2016 | Juvani |
| 2016/0188575 A1 | 6/2016 | Sawaf |
| 2016/0188576 A1 | 6/2016 | Huang |
| 2016/0188661 A1 | 6/2016 | Zhang et al. |
| 2016/0188703 A1 | 6/2016 | Zhang et al. |
| 2016/0217124 A1 | 7/2016 | Sarikaya et al. |
| 2016/0239476 A1 | 8/2016 | Huang |
| 2016/0267073 A1 | 9/2016 | Noeman et al. |
| 2016/0299884 A1 | 10/2016 | Chioasca et al. |
| 2016/0357519 A1 | 12/2016 | Vargas et al. |
| 2017/0011739 A1 | 1/2017 | Huang et al. |
| 2017/0083504 A1 | 3/2017 | Huang |
| 2017/0169015 A1 | 6/2017 | Huang |
| 2017/0177564 A1 | 6/2017 | Rottmann et al. |
| 2017/0185583 A1 | 6/2017 | Pino et al. |
| 2017/0185586 A1 | 6/2017 | Rottmann et al. |
| 2017/0185588 A1 | 6/2017 | Rottmann et al. |
| 2017/0270102 A1 | 9/2017 | Herdagdelen et al. |
| 2017/0315988 A1 | 11/2017 | Herdagdelen et al. |

OTHER PUBLICATIONS

Non-Final Office Action dated Jan. 12, 2017, for U.S. Appl. No. 15/275,235 of Huang, F. et al., filed Sep. 23, 2016.
Notice of Allowance dated Nov. 30, 2016, for U.S. Appl. No. 14/302,032 of Herdagdelen, A., filed Jun. 11, 2014.
U.S. Appl. No. 15/275,235 of Huang, F. et al., filed Sep. 23, 2016.
Non-Final Office Action dated Jan. 19, 2017, for U.S. Appl. No. 14/980,654 of Pino, J. et al., filed Dec. 28, 2015.
Non-Final Office Action dated Dec. 17, 2015, for U.S. Appl. No. 14/302,032 of Saint Cyr, L., filed Jun. 11, 2014.
U.S. Appl. No. 14/302,032 of Herdagdelen, A. et al., filed Jun. 11, 2014.
U.S. Appl. No. 14/621,921 of Huang, F., filed Feb. 13, 2015.
U.S. Appl. No. 14/586,022 of Huang, F. et al., filed Dec. 30, 2014.
U.S. Appl. No. 14/967,897 of Huang F. et al., filed Dec. 14, 2015.
U.S. Appl. No. 14/980,654 of Pino, J. et al., filed Dec. 28, 2015.
Final Office Action dated Jul. 1, 2016, for U.S. Appl. No. 14/302,032 of Herdagdelen, A., filed Jun. 11, 2014.
Non-Final Office Action dated Mar. 10, 2016, for U.S. Appl. No. 14/621,921 of Huang, F., filed Feb. 13, 2015.
Notice of Allowance dated Jul. 18, 2016, for U.S. Appl. No. 14/621,921 of Huang, F., filed Feb. 13, 2015.
U.S. Appl. No. 15/199,890 of Zhang, Y. et al., filed Jun. 30, 2016.
U.S. Appl. No. 15/244,179 of Zhang, Y., et al., filed Aug. 23, 2016.
Final Office Action dated Jun. 16, 2017, for U.S. Appl. No. 14/586,022 of Huang, F. et al., filed Dec. 30, 2014.
Notice of Allowance dated Jun. 6, 2017, for U.S. Appl. No. 14/981,794 by Rottman, K., et al., filed Dec. 28, 2015.
Non-Final Office Action dated Jun. 26, 2017, for U.S. Appl. No. 15/445,978 of Herdagdelen, A., filed Feb. 28, 2017.
Zamora, J.D., et al., "Tweets language identification using feature weightings," Proceedings of the Twitter language identification workshop, Sep. 16, 2014, 5 pages.
Extended European Search Report for European Application No. 16161095.1, dated Feb. 16, 2017, 4 pages.
U.S. Appl. No. 15/644,690 of Huang, F. et al., filed Jul. 7, 2017.
Notice of Allowance dated Jul. 12, 2017, for U.S. Appl. No. 14/981,794 by Rottmann, K., et al., filed Dec. 28, 2015.
Supplemental Notice of Allowability dated Jul. 13, 2017, for U.S. Appl. No. 14/981,769 by Rottmann, K., et al., filed Dec. 28, 2015.
Corrected Notice of Allowability dated Jul. 13, 2017, for U.S. Appl. No. 14/973,387 of Rottmann, K., et al., filed Dec. 17, 2015.
International Search Report and Written Opinion for International Application No. PCT/US2015/051737, dated Jul. 28, 2016, 22 pages.
Koehn, P. et al., "Statistical Phrase-Based Translation," Proceedings of the 2003 Conference of the North American Chapter of the Association for computational Linguistics on Human Language Technology—vol. 1, Assoc. for Computational Linguistics, 2003, p.
Non-Final Office Action dated Dec. 29, 2016, for U.S. Appl. No. 14/586,049 of Huang, F. et al., filed Dec. 30, 2014.
Non-Final Office Action dated Dec. 30, 2016 in U.S. Appl. No. 14/586,074 by Huang, F. et al., filed Dec. 30, 2014.
Non-Final Office Action dated Jul. 28, 2016, for U.S. Appl. No. 14/861,747 of F. Huang, filed Sep. 22, 2015.
Non-Final Office Action dated Nov. 9, 2016, for U.S. Appl. No. 14/973,387 by Rottmann, K., et al., filed Dec. 17, 2015.
Non-Final Office Action dated Oct. 6, 2016, U.S. Appl. No. 14/981,794 of Rottmann, K. filed Dec. 28, 2015.
Notice of Allowance dated Apr. 13, 2017, for U.S. Appl. No. 14/973,387 of Rottmann, K., et al., filed Dec. 17, 2015.
Notice of Allowance dated Apr. 19, 2017, for U.S. Appl. No. 14/981,769 by Rottmann, K., et al., filed Dec. 28, 2015.
Notice of Allowance dated Apr. 20, 2017 for U.S. Appl. No. 14/302,032 by Herdagdelen, A., et al., filed Jun. 11, 2014.
Notice of Allowance dated Apr. 7, 2017 for U.S. Appl. No. 14/861,747 by Huang, F., et al., filed Sep. 22, 2015.
Notice of Allowance dated Mar. 1, 2017, for U.S. Appl. No. 14/981,769 by Rottmann, K., et al., filed Dec. 28, 2015.
Sutskever, I., et al., "Sequence to sequence learning with neural networks," Advances in Neural Information Processing Systems, pp. 3104-3112, 2014.
U.S. Appl. No. 14/586,049, by Huang et al., filed Dec. 30, 2014.
U.S. Appl. No. 14/586,074 by Huang et al., filed Dec. 30, 2014.
U.S. Appl. No. 14/861,747 by Huang, F., filed Sep. 22, 2015.
U.S. Appl. No. 14/973,387, of Rottmann, K., et al., filed Dec. 17, 2015.
U.S. Appl. No. 14/981,769 by Rottmann, K., et al., filed Dec. 28, 2015.
U.S. Appl. No. 14/981,794 by Rottmann, K., et al., filed Dec. 28, 2015.
U.S. Appl. No. 15/445,978 by Herdagdelen, A., et al., filed Feb. 28, 2017.
Vogel, S. et al., "HMM-Based Word Alignment in Statistical Translation." In Proceedings of the 16th Conference on Computational Linguistics—vol. 2, Association for Computational Linguistics, 1996, pp. 836-841.
Final Office Action dated Aug. 10, 2017 for U.S. Appl. No. 15/275,235 by Huang, F. et al., filed Sep. 23, 2016.
Final Office Action dated Aug. 25, 2017 for U.S. Appl. No. 14/980,654 by Pino, J. et al., filed Dec. 28, 2015.
Non-Final Office Action dated Aug. 25, 2017 for U.S. Appl. No. 15/652,175 by Herdagdelen, A., filed Jul. 17, 2017.
Non-Final Office Action dated Aug. 29, 2017 for U.S. Appl. No. 14/967,897 by Huang, F., filed Dec. 14, 2015.
Notice of Allowance dated Aug. 4, 2017, for U.S. Appl. No. 14/981,794 by Rottman, K., et al., filed Dec. 28, 2015.

(56) References Cited

OTHER PUBLICATIONS

Notice of Allowance dated Jul. 26, 2017, for U.S. Appl. No. 14/586,074 by Huang, F., et al., filed Dec. 30, 2014.
Notice of Allowance dated Jul. 28, 2017, for U.S. Appl. No. 14/586,049 by Huang, F., et al., filed Dec. 30, 2014.
U.S. Appl. No. 15/652,144 of Rottman, K., filed Jul. 17, 2017.
U.S. Appl. No. 15/654,668 of Rottman, K., filed Jul. 19, 2017.
Final Office Action dated Sep. 8, 2017 for U.S. Appl. No. 15/445,978 of Herdagdelen, A., filed Feb. 28, 2017.
Notice of Allowability dated Sep. 12, 2017 for U.S. Appl. No. 14/981,794 by Rottman, K., et al., filed Dec. 28, 2015.
Notice of Allowance dated Oct. 10, 2017 for U.S. Appl. No. 15/275,235 for Huang, F. et al., filed Sep. 23, 2016.
Notice of Allowance dated Oct. 23, 2017 for U.S. Appl. No. 15/445,978 of Herdagdelen, A., filed Feb. 28, 2017.
U.S. Appl. No. 15/672,690 of Huang, F., filed Aug. 9, 2017.
U.S. Appl. No. 15/696,121 of Rottmann, K. et al., filed Sep. 5, 2017.
U.S. Appl. No. 15/723,095 of Tiwari, P. filed Oct. 2, 2017.

\* cited by examiner

MINING MULTI-LINGUAL DATA

BACKGROUND

The Internet has made it possible for people to connect and share information globally in ways previously undreamt of. Social media platforms, for example, enable people on opposite sides of the world to collaborate on ideas, discuss current events, or just share what they had for lunch. In the past, this spectacular resource has been somewhat limited to communications between users having a common natural language ("language"). In addition, users have only been able to consume content that is in their language, or for which a content provider is able to determine an appropriate translation.

While communication across the many different languages used around the world is a particular challenge, several machine translation engines have attempted to address this concern. Machine translation engines enable a user to select or provide a content item (e.g., a message from an acquaintance) and quickly receive a translation of the content item. Machine translation engines can be created using training data that includes identical or similar content in two or more languages. Multilingual training data is generally obtained from news reports, parliament domains, educational "wiki" sources, etc. In many cases, the source of the training data that is used to create a machine translation engine is from a considerably different domain than the content on which that machine translation engine is used for translations. For example, content in the social media domain often includes slang terms, colloquial expressions, spelling errors, incorrect diacritical marks, and other features not common in carefully edited news sources, parliament documents, or educational wiki sources.

DETAILED DESCRIPTION

Figure 1:
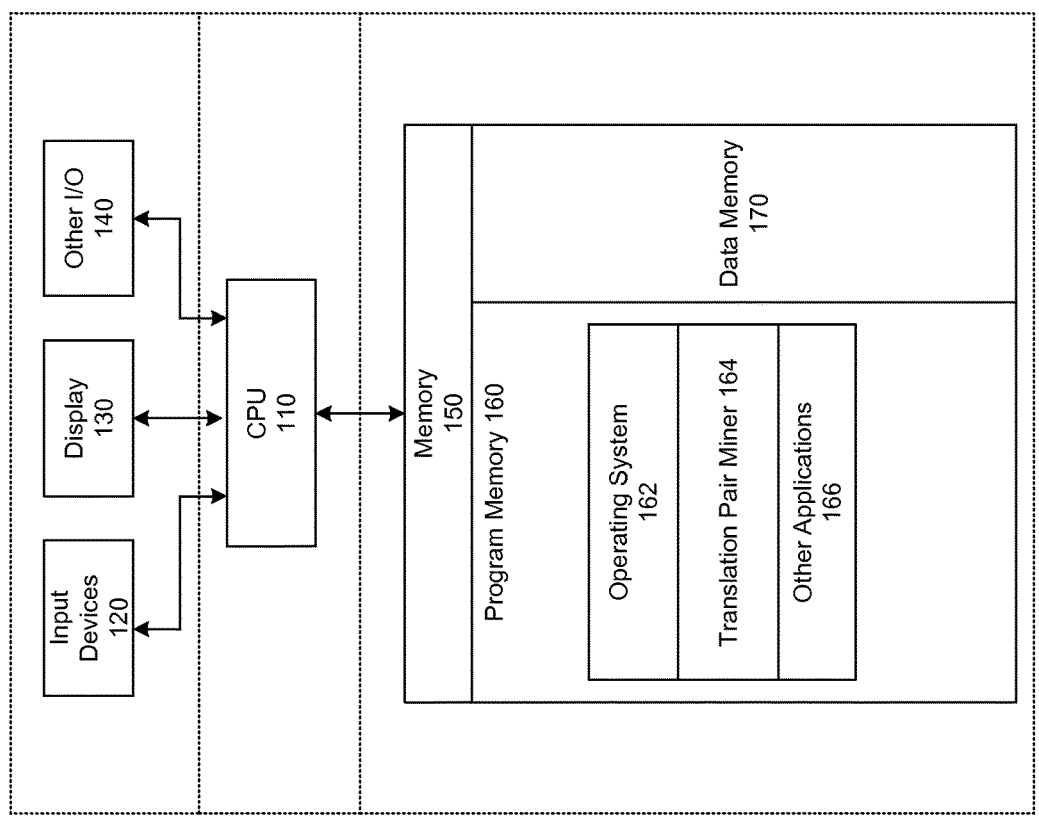
FIG. 1 is a block diagram illustrating an overview of devices on which some embodiments of the disclosed technology can operate.

Implementations of machine translation engines are described herein that are trained using in-domain training data that are potential translation pairs from 1) single content items that contain multiple languages; 2) multiple content items in different languages that are related to the same or similar target; or 3) multiple content items that are generated by the same author in different languages. These sources can be filtered to remove potential sources that are unlikely to contain translations. Remaining potential translations can be analyzed to obtain in-domain training data. This process improves the ability of machine translation engines to automatically translate text without requiring significant manual input.

One of the challenges in building machine translation engines is a lack of current, in-domain translation pair training data. As used herein, a "translation pair" or "actual translation pair" is a set of two language snippets where the language snippets are in different languages and one language snippet is a translation of the other. As used herein, a "language snippet" is a representation of one or more words that are all in the same language. It is impractical for humans to manually create translation pairs for the purpose of generating current in-domain training data. In the social medial domain, for example, the volume of content items is too massive for representative samples to be manually translated for creating in-domain training data. Furthermore, various subdomains can exist within any domain. For example, there could be a London dweller subdomain where a content item posted on a local event webpage included the text "I think the Chelsea referee is bent," meaning the author thinks the referee is dishonest or corrupt. A Spanish translation by an out-of-domain machine translation engine or by a general social media domain machine translation engine could generate the translation "Creo que el arbitro Chelsea se dobla," the literal meaning of which is that the author thinks the referee is contorted at an angle. In addition, in the social medial domain, the language used can change as segments of the population adopt new slang terms and grammar, as words are used in a manner inconsistent with standard definitions, or as specialized punctuation is employed. However, creating machine translation engines with training data that is not in-domain or that is stale can significantly reduce the accuracy of such machine translation engines.

Alternate sources of translation pairs, other than humans generating translations for the purpose of creating training data, can help generate current in-domain machine translation engines. Three alternate sources of potential translation pairs are 1) single content items that contain multiple languages; 2) multiple content items in different languages that are related to the same or similar target; and 3) multiple content items that are generated by the same author in different languages. As used herein, a "potential translation pair" is a set of two language snippets, whether from the same or different sources, that have not been verified as qualifying as a translation pair because one or both of the language snippets have not been identified as in a language desired for a translation pair, or because the language snippets have not been verified as translations of each other. As used herein, a "content item," "post," or "source" can be any recorded communication including text, audio, or video. As examples, a content item can be anything posted to a social media site such as a "wall" post, comment, status message, fan post, news story, etc. As used herein, a "target" of a content item is one or more of: a part within the content item such as a URL, image, or video; is an area to which the content item is posted, such as the comment area of another content item or a webpage for a particular topic such as a fan page or event; or is a node in a social graph to which the content item points to, links to, or is otherwise related.

In social media systems where millions of content items can be posted every hour, it is impractical to find translation pairs by analyzing each potential translation pair source thoroughly to find actual translation pairs if such pairs exist at all. By locating content items that fall into one of the above three categories, the sources that need to be thoroughly analyzed to find actual translation pairs can be significantly reduced. Locating content items, which can be social media posts or sub-parts thereof, that fall into one of the above three categories can include classifying language snippets of the selected items as being in a particular language. Classifying language snippets can be accomplished in numerous ways, such as by using context classifiers, dictionary classifiers, or trained n-gram analysis classifiers, as discussed in U.S. patent application Ser. No. 14/302,032. In addition, by applying filtering techniques described below, the number of located potential translation pairs can be further narrowed to quickly gather those that are good candidates for further analysis to locate actual translation pairs.

A first filtering technique can be applied for single content items that contain multiple languages. In some implementations, filtering for the single post source includes eliminating from consideration posts where a ratio of the number of terms between the language snippets of that post is beyond a specified threshold value.

A second filtering technique can be applied for the potential translation pairs that are from multiple content items in different languages and that are related to the same or similar target. In some implementations, filtering these sources from multiple content items in different languages includes eliminating potential translations pairs that are not within a particular time window of each other. In some implementations, filtering for sources from multiple content items in different languages includes comparing segments of content, such as three consecutive words across different snippets, for substantial similarity, and where a match is found, identifying the possible permutation of sentences between the posts containing those segments as potential translation pairs.

A third filtering technique can be applied for the potential translation pairs from multiple content items in different languages that are by the same author. In some implementations, filtering for the multiple post, same author, source includes eliminating potential translations pairs that were not posted within a specified time (e.g., a sliding time window) of each other.

In some implementations, there can be a desired one or more languages for the translation pair. In these implementations, each of the filtering techniques can further eliminate potential translation pairs that are not in those desired languages. In some implementations, each of these filtering techniques may also apply a smoothing technique to change term classifications that might be mistakes. For example, in a post that read, "we went to mi house," the typo of "mi" instead of "my" may have caused "mi" to be classified as Spanish. Applying smoothing in this example can cause this single Spanish classified word, surrounded by other non-Spanish words, to be reclassified to the surrounding classification.

While general machine translation engines do not perform very well in creating out-of-domain translations, they perform much better in identifying whether two language snippets of a potential translation pair are actual translations of each other. For example, in a single post that contains two language snippets in different languages, the snippets are likely to either be exact translations of each other, or they were the result of a user switching to a different language mid-post, in which case the two snippets are unlikely to have significant overlapping terms. General machine translation engines are able to reliably distinguish between these cases. Therefore, in some implementations, once potential translation pairs are obtained, a general machine translation engine can be used to determine whether they are actual translation pairs or not. However, in some implementations, much more involved comparisons are necessary to determine actual translation pairs from potential translation pairs. For example, where two posts are selected as having the same or similar target, they are likely to have similar terms but not be translations of each other. For example, two people could post a link to a video clip of a soccer goal by the Seattle Sounders Football Club. The first post may include the text "OMG, what a great shot, go Sounders!" The second post may include a Japanese version of "OMG, what a major fail, go away Sounders!" While having significantly different meanings, they use many of the same terms or terms such as "great" and "major." Therefore, determining whether to classify these as a translation pair may require significantly more analysis than just comparing terms for equivalence.

When actual translation pairs are located, they can be used to retrain a machine translation engine. The retrained machine translation engine would then be more domain specific a can classify input data according to a domain or subdomain identified for the translation pair training data. Subsequently, when a request for the translation of a content item is received, a corresponding in-domain machine translation engine can be selected. Furthermore, when the content item is identified as being in a particular subdomain, a machine translation engine specialized for that subdomain can be selected to perform the translation.

Several embodiments of the described technology are discussed below in more detail in reference to the figures. Turning now to the figures, FIG. 1 is a block diagram illustrating an overview of devices 100 on which some embodiments of the disclosed technology may operate. The devices can comprise hardware components of a device 100 that is configured to mine translation pairs. Device 100 can include one or more input devices 120 that provide input to the CPU (processor) 110, notifying it of actions. The actions are typically mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 has access to a memory 150. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 includes program memory 160 that stores programs and software, such as an operating system 162, translation pair miner 164, and any other application programs 166. Memory 150 also includes data memory 170 that can include dictionaries and lexicons, multi-lingual single social media posts, social media posts with a common target, social media posts with a common author, machine translation engines, domain and subdomain machine translation engine classifiers, configuration data, settings, and user options or preferences which can be provided to the program memory 160 or any element of the device 100.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, tablet devices, multiprocessor systems, microprocessor-based systems, set-top boxes, programmable consumer electronics, network PCs, minicomputers, mainframe computers, distributed computing environments that include any of the above systems or devices, and the like.

Figure 2:
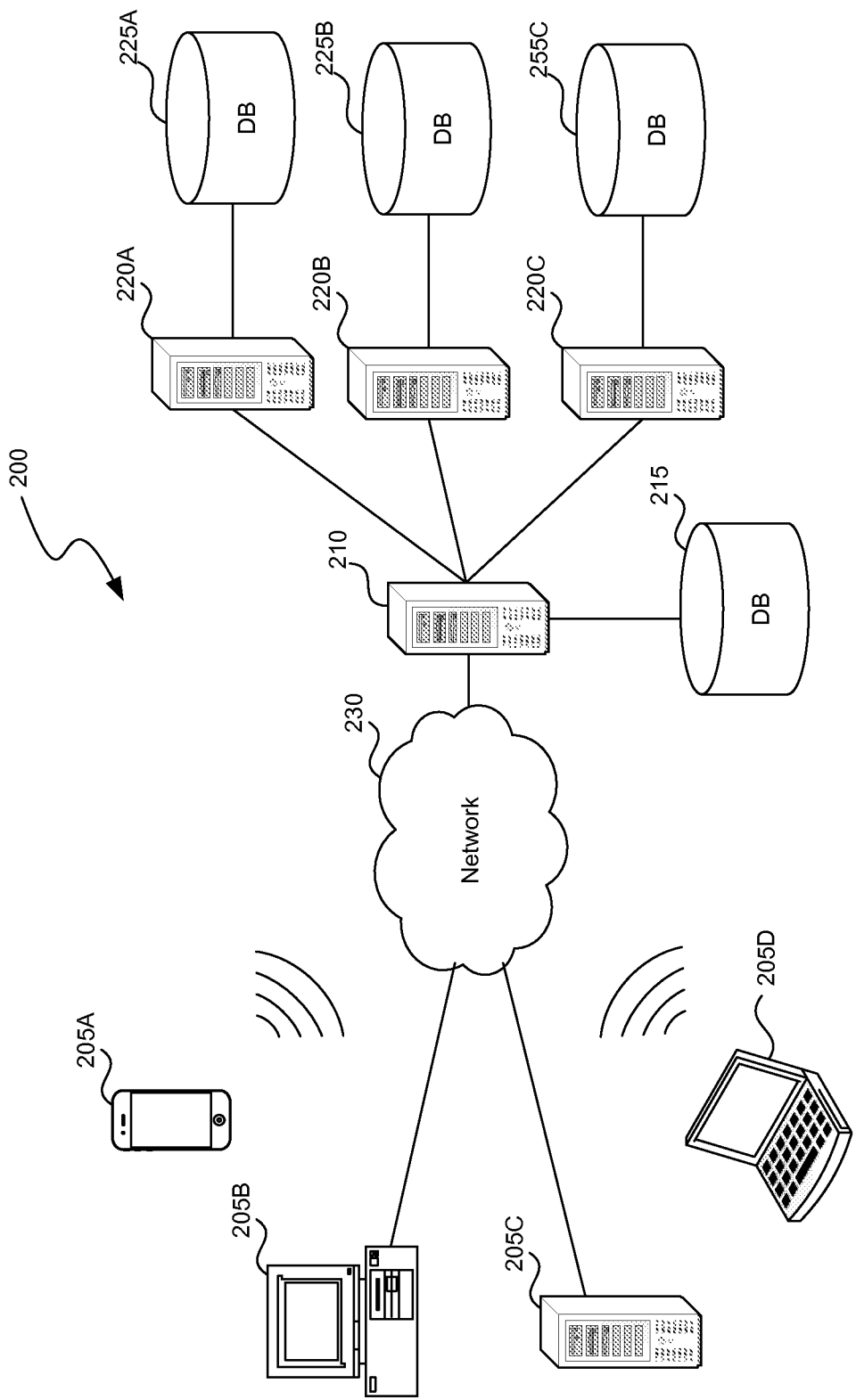
FIG. 2 is a block diagram illustrating an overview of an environment in which some embodiments of the disclosed technology can operate.

FIG. 2 is a block diagram illustrating an overview of an environment 200 in which some embodiments of the disclosed technology may operate. Environment 200 can include one or more client computing devices 205A-D, examples of which may include device 100. Client computing devices 205 can operate in a networked environment using logical connections 210 through network 230 to one or more remote computers such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 may correspond to a group of servers, and each of these servers can share a database or can have their own database. Databases 215 and 225 can warehouse (e.g. store) information such as lexicons, machine translation engines, social media posts and other data to search for potential translation pairs, and actual translation pairs that have been located. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. The client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
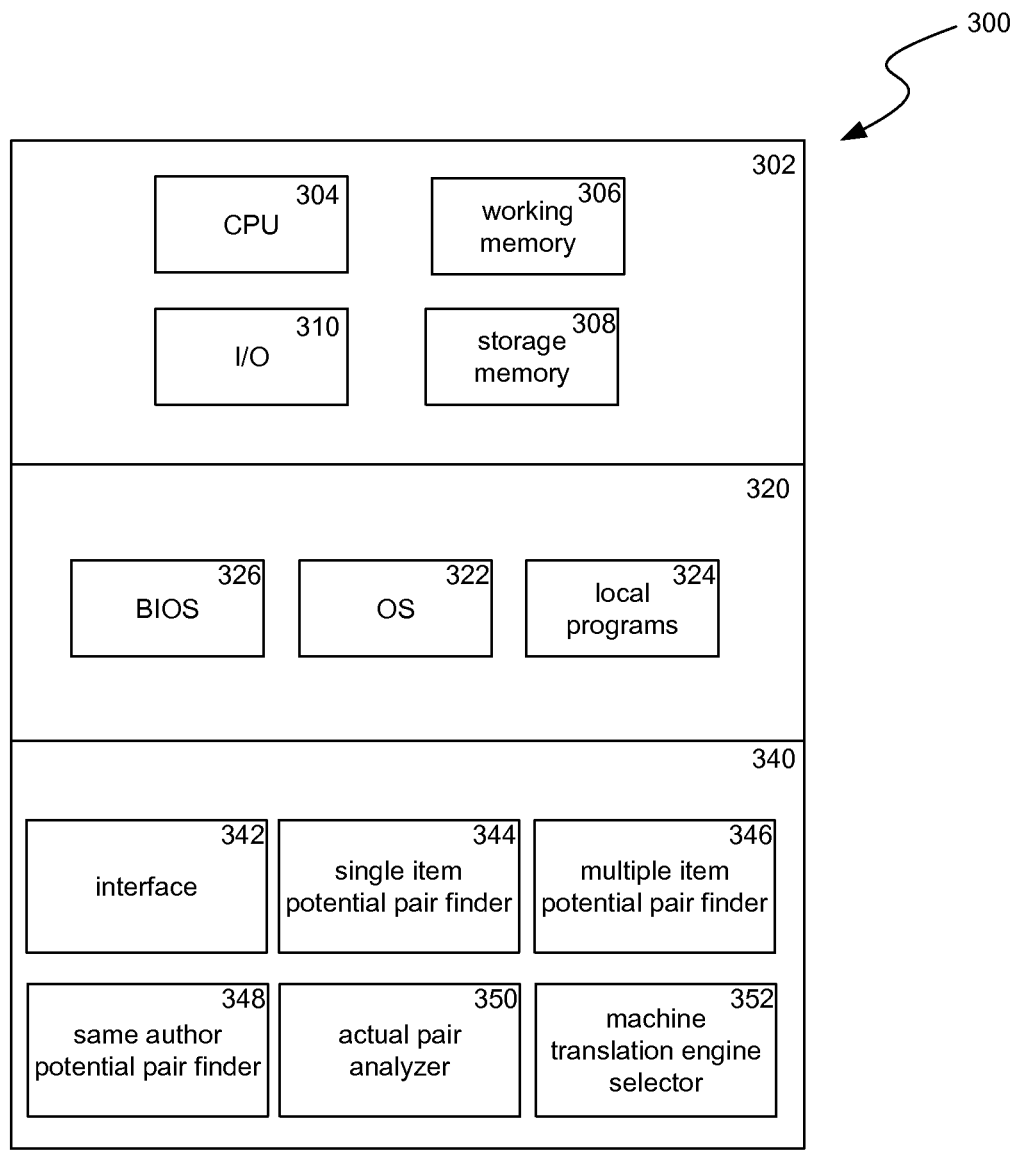
FIG. 3 is a block diagram illustrating components which, in some embodiments, can be used in a system implementing the disclosed technology.

FIG. 3 is a block diagram illustrating components 300 which, in some embodiments, can be used in a system implementing the disclosed technology. The components 300 include hardware 302, general software 320, and specialized components 340. As discussed above, a system implementing the disclosed technology can use various hardware including central processing units 304, working memory 306, storage memory 308, and input and output devices 310. Components 300 can be implemented in a client computing device such as client computing devices 205 or on a server computing device, such as server computing device 210 or 220.

General software 320 can include various applications including an operating system 322, local programs 324, and a BIOS 326. Specialized components 340 can be subcomponents of a general software application 320, such as a local program 324. Specialized components 340 can include single item potential pair finder 344, multiple item potential pair finder 346, same author potential pair finder 348, actual pair analyzer 350, machine translation engine selector 352, and components which can be used for controlling and receiving data from the specialized components, such as interface 342.

Single item potential pair finder 344 can be configured to obtain and filter potential translation pairs from singular social media content items. This can be accomplished by locating, within the social media content items, items that contain a language snippet classified as in a different language from another language snippet of that item. Single item potential pair finder 344 can determine that some of these content items are either not relevant for a desired language or are not likely actual translation pairs and thus eliminate these potential translation pairs from consideration. This filtering can occur by eliminating the content items whose language snippet classifications do not match a desired set of languages for which training data is being gathered. In addition, this filtering can occur by computing, for two or more language snippets of a content item in different languages, a ratio of terms between the language snippets. If the ratio is too high or too low, for example outside a specified threshold window such as 3:2-2:3, then it is unlikely that these snippets are translations of one another and can be eliminated. In some implementations, the threshold window can be set based on the languages that are being compared. For example, it may be determined that average German phrases use twice as many words as the same phrases in Chinese. Thus, the threshold ratio for German/Chinese can be set to a value larger than two to one, such as 3:1. Such filtering, as described here and below in relation to other filtering systems and procedures, can comprise either selecting the initial set of eligible content items and then removing those that are not desired or that are not likely translation pairs, or can comprise additional parameters for the initial search for content items, such that only content items that are in desired languages and that are likely translation pairs are selected as potential translation pairs.

Multiple item potential pair finder 346 can be configured to obtain and filter additional types of potential translation pairs from social media content items. This can be accomplished by locating, within the social media content items, pairs of content items that are for the same or similar target. A pair of content items that are for the same or similar target, in various implementations, are ones that contain the same or similar element such as a URL, an image, a video, or a document, or that are posted to or about the same or similar other content item, such as a forum for a particular topic, a comments area of another post, within a group chat session, a fan site, a page for reviews of an item or a service, etc. The number of posted content items that multiple item potential pair finder 346 can locate can be quite large in large social media sites where the same URL, for example, could be shared millions of times, and the permutations of different language pairs increases the size of this set exponentially. Multiple item potential pair finder 346 can determine that some of these content item pairs are either not relevant for a desired language or are not likely actual translation pairs and thus eliminate such potential translation pairs from consideration. This filtering can occur by only identifying content items as a potential translation pair if the content items are within a specified threshold amount of time of one another. In addition, the filtering can comprise eliminating individual content items which, individually or as a pair, do not match one or more desired languages. Furthermore, individual content items can be split (divided) into segments of a particular length, such as three words. Using a matching algorithm, such as translation dictionary matching, segments from content items in a first language can be compared to segments in other content items for the same or similar target in another language. The level of match required between segments can vary across implementations. For example, in various implementations, a match may be found when all the words of a segment match, when a percentage such as at least 75% match, or when at least a number, such as two, match. All potential translation pairs can be eliminated that do not have at least one matching segment between the pair.

Same author potential pair finder 348 can be configured to obtain and filter potential translation pairs from social media content items that are from the same author. These potential translation pairs can be filtered based on being in different languages and being within a sliding time window. As in the filtering methods above, these potential translation pairs can also be filtered by eliminating those that are not in a desired language.

Potential translation pairs from: single item potential pair finder 344, multiple item potential pair finder 346, and same author potential pair finder 348 can be passed to actual pair analyzer 350. Actual pair analyzer 350 can be configured to analyze potential translation pairs to determine whether they comprise an actual translation pair. Depending on the source of the potential translation pair, this can be accomplished in a variety of ways. For example, when the content item source is a single "wall" post or multiple posts by a single author, and therefore the language snippets of resulting potential translation pairs are only likely to be similar if they are translations of each other, a general machine translation engine can be used to quickly determine whether they are actual translations. However, when the source is multiple content items that share a target, and thus are likely to be similar without being translations, a more advanced analysis can be performed. Such an advanced analysis can include identifying a number of characteristics of each language snippet and using them to perform an in-depth analysis to identify actual translation pairs. Furthermore, determining actual translation pairs can be a two-step process in which, first, a general machine translation engine is used to determine whether the potential translation pair is an actual translation, and if the results from the general machine translation engine are inconclusive, the more advanced analysis can be performed.

The machine translation engine selector 352 can select a particular machine translation engine to use to fulfill a request to translate a particular content item. In some cases, a content item that has been requested to be translated is associated with a particular domain or subdomain. Machine translation engine selector 352 can select a machine translation engine to translate that content item which most closely matches the domain or subdomain of the content item. In some implementations, domains and subdomains may be logically organized as a tree structure, and the machine translation engine selector 352 may select the machine translation engine corresponding to the lowest node (i.e. closest to a leaf node) in the tree which matches the domain or subdomain of the content item. For example, a content item could be classified in the subdomain Welling United, which is a soccer club in London. A domain tree could include the branch: (Social Media)→(England)→(London)→(Soccer Fans)→(Chelsea). The most closely matching machine translation engine could the one corresponding to the (Social Media)→(England)→(London)→(Soccer Fans) node.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc.

Figure 4:
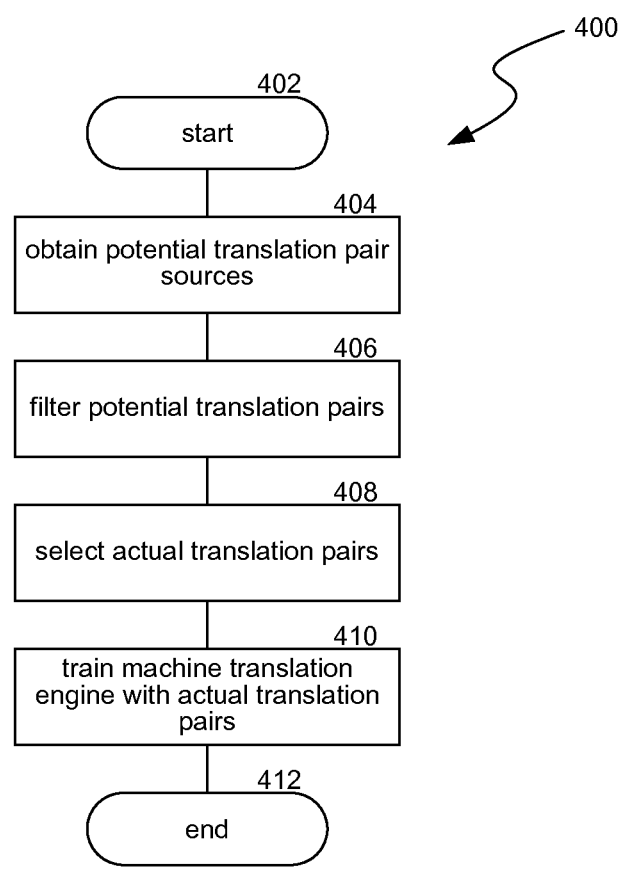
FIG. 4 is a flow diagram illustrating a process used in some embodiments for mining and using translation pairs from social media sources.

FIG. 4 is a flow diagram illustrating a process 400 used in some embodiments for mining and using translation pairs from social media sources. Translation pairs found by process 400 can be used, for example, to train machine translation engines to be in-domain for translating social media content items. Process 400 begins at block 402. At block 404 sources of potential translation pairs are obtained. The sources obtained at block 404 may be for a particular domain, such as social media generally, or for a subdomain, such as boat enthusiasts, people in Sydney, Australia, or the Xiang Chinese dialect. Each of the potential translation pair sources found at block 404 can be in any one or more of the following three categories: 1) a single content item containing language snippets in different languages, 2) multiple content items that have the same or similar target; and 3) multiple content items by the same author.

At block 406, the sources of potential translation pairs can be filtered to eliminate potential translation pairs that are unlikely to contain actual translation pairs. Depending on the category of each potential translation pair source, various filtering procedures can be applied. Filtering procedures that can be applied for a single post containing language snippets in different languages are described in greater detail below in relation to FIG. 5A. Filtering procedures that can be applied for multiple posts that have the same or similar target are described in greater detail below in relation to FIG. 5B. Filtering procedures that can be applied for multiple posts by the same author are described in greater detail below in relation to FIG. 5C. Filtering procedures can be automatic or automated, meaning that, though they may or may not be configured by a human, they are applied by a computing system without the need for further human input.

At block 408, remaining potential translation pairs are analyzed to select actual translation pairs. Selecting potential translation pairs that are actual translation pairs is discussed in greater detail below in relation to FIG. 6.

At block 410, the selected translation pairs from block 408 can be used to train one or more in-domain machine translation engines. In some embodiments, creating an in-domain machine translation engine comprises retraining a previously created machine translation engine with the selected translation pair training data. This can comprise updating a general machine translation engine or further training an in-domain machine translation engine. In some embodiments, creating an in-domain machine translation engine comprises using only training data from the domain or subdomain of content items from which the resulting machine translation engine will translate. Once a machine translation engine is created it can be classified according to the source of the training data used to create it. For example, a high level "social media" machine translation engine can be created, such as for English→Spanish; regional or dialectic machine translation engines can be created such as Dublin→Mandarin; topic based machine translation engines can be created such as United States Navy Personnel→German. In some implementations, combinations thereof can be created such as Russian Car Enthusiast→General English. In some implementations, machine translation engines can be used within the same language, such as South Boston-→Northern England or Australian Soccer Fan→American Football fan. Use of the classifications assigned to machine translation engines for the domain or subdomain is described in greater detail below in relation to FIG. 7.

Figure 5A:
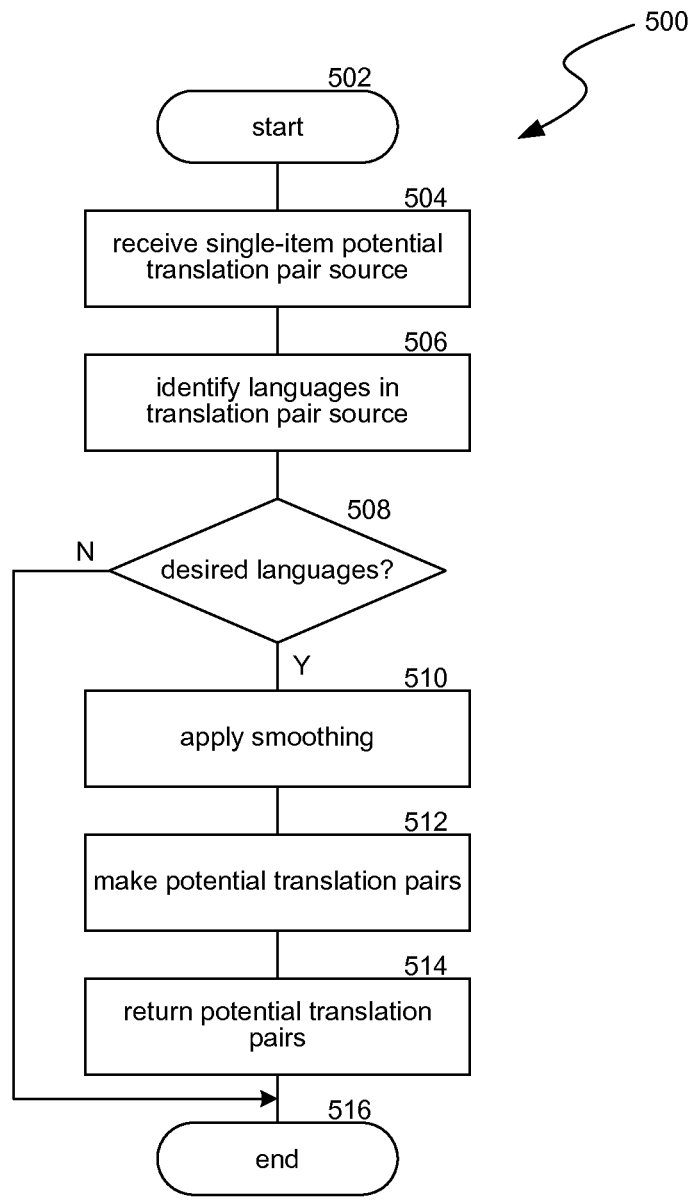
FIG. 5A is a flow diagram illustrating a process used in some embodiments for locating potential translation pairs from a single content item.

FIG. 5A is a flow diagram illustrating a process 500 used in some embodiments for locating potential translation pairs from a single item. Process 500 begins at block 502 and continues to block 504. At block 504 a potential translation pair from a single item is received. As described above, a potential translation pair from a single item can be a post where, within the post, multiple languages are used. Content items that comprise language snippets in multiple languages may be a good source for potential translation pairs because there are many content item authors that are attempting to reach audiences across language barriers, and thus they create posts with the same content written in multiple languages. In some implementations, these posts are collected from particular sources where they are likely to contain translation pairs, such as: when the post is by a business that has a multi-lingual clientele, when the post is to a fan page focused in a region where multiple languages are spoken, or where the user who authored the post is known to be multilingual or is known to interact with other users who are facile with at least one language other than the primary language of the post author.

At block 506 the languages in the potential translation pair can be identified. At block 508, the languages identified in block 506 are compared to desired languages for a machine translation engine to be generated. For example, where the machine translation engine to be generated is a Chinese→German machine translation engine, content items that do not contain language snippets in both Chinese and German are eliminated by blocks 506 and 508. If the language(s) identified is a desired language, process 500 continues to block 510. Otherwise, process 500 continues to block 516, where it ends. In some implementations, process 500 is not performed to obtain specific desired languages translation pairs, and thus in these implementations, the operations of blocks 506 and/or 508 to eliminate potential translation pairs that do not match desired languages may not be performed.

At block 510 the content item identified at block 504 can be smoothed to eliminate language classifications for small snippets which are likely to be mistakenly classified. Smoothing can include finding snippets that have a number of terms below a specified smoothing threshold that are also surrounded by two portions which have the same language classification as each other and that language classification is different from the language classification of the snippet. Such snippets are likely misclassified, and thus the language classification of these snippets can be changed to that of the portions surrounding that snippet. For example, a content item that includes the text: "It's all por the money," could be classified as three snippets 1) English: "It's all" 2) Spanish: "por," and 3) English: "the money." The specified smoothing threshold could be two words, so "por," a single word surrounded by English snippets, would be reclassified as English, making the entire post into a single snippet—English: "It's all por the money."

At block 512 the post identified at block 504 is split according to the portions that are snippets in different languages. The possible permutations of different language pairs from these snippets can be created. For example, if a post includes the snippets: <German>, <English>, and <French>, the resulting three permutations of potential translation pairs could be <German><English>, <German><French>, and <English><French>. If process 500 is being performed with one or more desired languages, it can be that only the permutations that include a snippet in at least one of those desired languages are created or kept. Continuing the previous example, if process 500 is being performed to create a German/French social media machine translation engine, the only permutation that would be created is the <German><French>pair.

In some implementations, at block 512, the potential translation pairs can also only be kept (or only ever created) where a ratio between terms of that potential translation pair is within a specified term ratio threshold. For example, the specified term ratio threshold could be 3:1 indicating that only language snippets where the number of terms in a first of the snippets is no more than three time the number of terms of the second snippet. In some implementations, the ratio could be independent of order, for example the 3:1 ratio can be 3:1 or 1:3.

At block 514, if the potential translation pair source received at block 504 resulted in one or more potential translation pairs, the potential translation pairs identified by process 500 are returned. Process 500 then continues to block 516, where it ends.

Figure 5B:
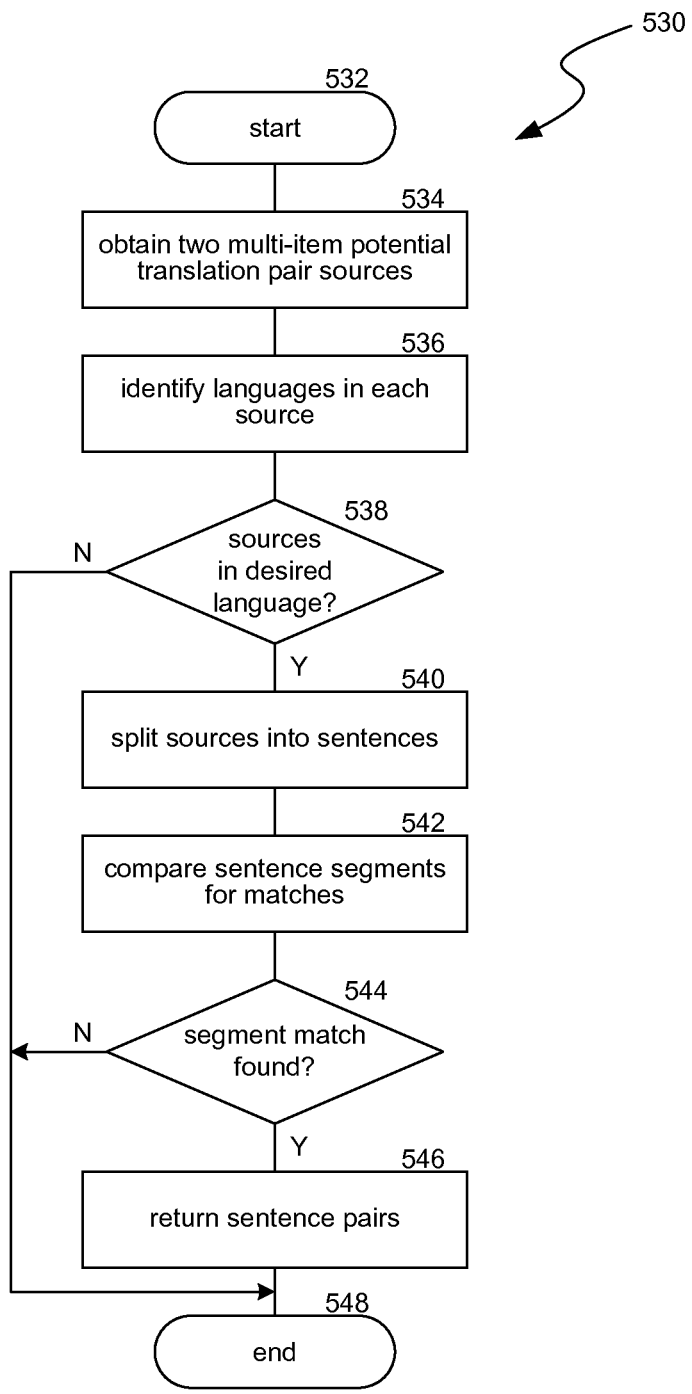
FIG. 5B is a flow diagram illustrating a process used in some embodiments for locating potential translation pairs from multiple content items corresponding to the same or similar target.

FIG. 5B is a flow diagram illustrating a process 530 used in some embodiments for locating potential translation pairs from multiple items corresponding to the same or similar target. Users that create posts for the same or similar target are likely to say the same thing: therefore, such posts in different languages are a good source of potential translation pairs. Process 530 begins at block 532 and continues to block 534. At block 534 two sources of multi-post potential translation pairs that are in different languages and are directed to the same or similar target are obtained. As discussed above, content items that are directed to the same or similar target comprise those that either A) contain the same item such as a URL, image, video, sound, or document or B) are for the same topic, such as being a comment on the same post, a message or post directed to the same user, or otherwise a content item on a page or content area dedicated to the same subject. In some implementations, only sources of potential translation pairs that are within a specified threshold time of each other are obtained. Because each source of multi-post potential translation pairs can be paired with numerous other sources of multi-post potential pairs, process 530 can be performed multiple times with different permutations that comprise sources of multi-post potential translation pairs that have previously been analyzed in other permutations.

Similarly to block 506, at block 536 the languages in the potential translation pair sources are identified. At block 538, the languages identified in block 536 are compared to desired languages for a machine translation engine to be generated. If the identified language matches a desired language, process 530 continues to block 540. Otherwise, process 530 continues to block 548, where it ends. In some implementations, process 530 is not being performed to obtain specific desired languages translation pairs, and thus in these implementations, the operations of block 536 and/or 538 to eliminate potential translation pairs that do not match desired languages may not be performed.

At block 540 each source of multi-post potential pairs obtained at block 534 can be split into a group of sentences. The group of sentences from the first source is referred to herein as group X and the group of sentences from the second source is referred to herein as group Y. In some implementations, smoothing, as discussed above in relation to block 510 may also be applied to the sentences in either group X and/or group Y.

At block 542 each sentence from group X and group Y are further split into segments of no more than a particular length, such as three, four, or five terms. The segments from group X are referred to herein as segments X* and the segments from group Y are referred to herein as segments Y*. Each of segments X* can be compared to each of segments Y* to determine if there is any match. A match between a first and a second segment means that at least some specified threshold of words from the first segment is a translation of the words in the second segment. In various implementations, this threshold can be 100%, 80%, 75%, 66%, or 50%.

At block 544, process 530 makes a determination of whether there are any matching segments between the segments in segments X* and segments Y*. In some implementations, if any segment from segments X* match a segment from segments Y* then each permutation of the sentences from group X and group Y is identified as a potential translation pair. In some implementations only the pairs of sentences, one from group X and one from group Y, containing the matching segments are identified as a potential translation pair. At block 546, any of the potential translation pairs identified in block 544 are returned. Process 530 then continues to block 548, where it ends.

Figure 5C:
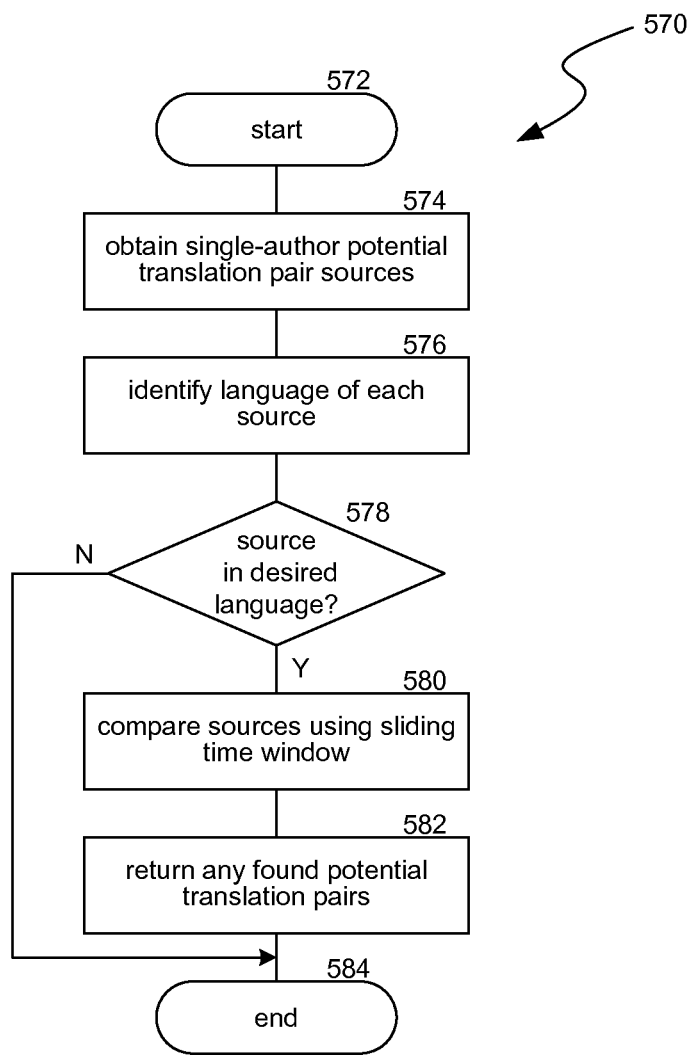
FIG. 5C is a flow diagram illustrating a process used in some embodiments for locating potential translation pairs from multiple content items generated by the same author.

FIG. 5C is a flow diagram illustrating a process 570 used in some embodiments for locating potential translation pairs from multiple items generated by the same author. Process 570 begins at block 572 and continues to block 574. At block 574 two sources of potential translation pairs that are in different languages and are by the same author are obtained. Content items that are by the same author that are in different languages, particularly when within a short time frame, are likely to be direct translations of each other, for example where a store posts an item for sale in English, then immediately reposts the same item for sale in Spanish. Furthermore, because the permutations of sources of potential translation pairs that are in different languages and are by the same author are likely to be few in number as compared to other sources of potential translation pairs, they can be quickly searched for being actual translation pairs.

Similarly to blocks 506 and 536, at block 576 the languages in the potential translation pair sources are identified. At block 578, the languages identified in block 576 are compared to desired languages for a machine translation engine to be generated. If the identified language is a desired language, process 570 continues to block 580. Otherwise, process 570 continues to block 584, where it ends. In some implementations, process 570 is not being performed to obtain specific desired languages translation pairs, and thus in these implementations, the operations of block 576 and/or 578 to eliminate potential translation pairs that do not match desired languages may not be performed.

At block 580 the sources of potential translation pairs obtained at block 574 are compared to determine whether they are within a specified time threshold of each other. This time threshold can be configured to select sources of potential translation pairs that were posted closely so as to be likely to be direct translations of each other. In some implementations, this filtering of sources of potential translation pairs can be part of the query operations performed at block 574. Pairs of sources of potential translation pairs within the time threshold can be marked as potential translation pairs. These marked potential translation pairs can be returned at block 582. Process 570 then continues to block 584, where it ends.

Figure 6:
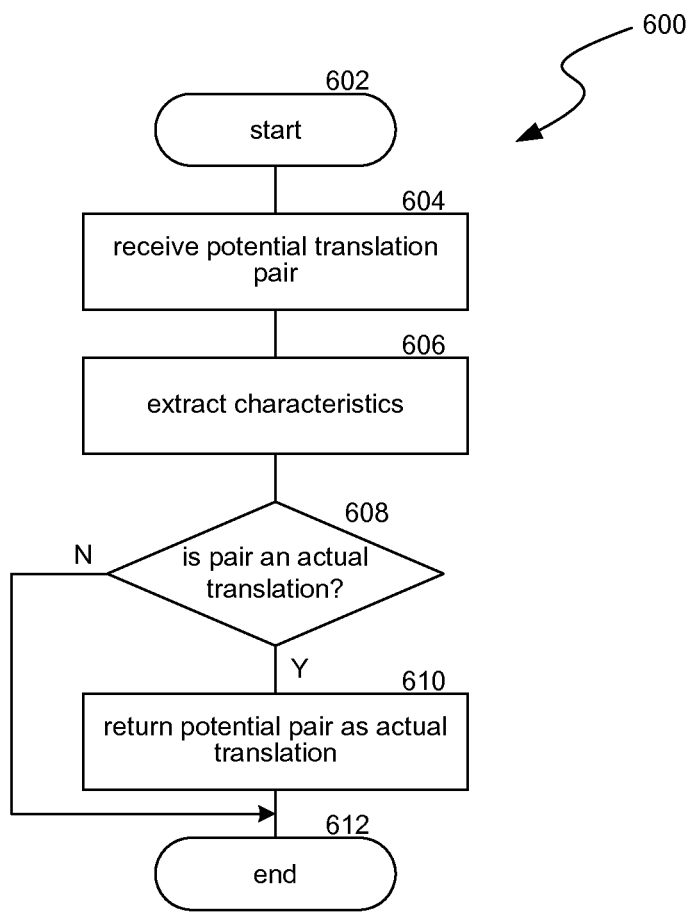
FIG. 6 is a flow diagram illustrating a process used in some embodiments for selecting actual translation pairs from potential translation pairs.

FIG. 6 is a flow diagram illustrating a process 600 used in some embodiments for selecting actual translation pairs from potential translation pairs. Process 600 begins at block 602 and continues to block 604. At block 604 a potential translation pair is received. In some implementations, the potential translation pair includes an identification of a source of the potential translation pair. Examples of potential translation pair sources are: 1) a single content item that contains multiple languages; 2) multiple content items in different languages that are related to the same or similar target; and 3) multiple content items that are generated by the same author in different languages within a timeframe. In some implementations, the received potential translation pair is a pair returned from one of process 500, 530, or 570.

At block 606 one or more characteristics are extracted for each of the language snippets that the received potential translation pair comprises. In some implementations extracted characteristics comprise one or more words or phrases from the first language snippet to compare to one or more words or phrases from the second language snippet. A more general machine translation engine can be sued to compare the extracted words or phrases to determine if the potential translation pair is an actual translation pair. This type of computationally inexpensive comparison can be highly accurate for determining if a potential translation pair is an actual translation pair where the language snippets are highly likely to be direct translations of each other when they are similar. In some implementations, it can be the case that potential translation pairs that are highly similar are not direct translations of each other. In these implementations, more characteristics of the languages snippets can be extracted for comparison to determine if the potential translation pair is an actual translation pair. In some of these implementations where more characteristics of the languages snippets are extracted, the extracted characteristics can comprise data to compute, as an all-to-all alignment between language snippets, any one or more of: a ratio of a number of words; an IBM score, maximum fertility, a number of covered words, a length of a longest sequence of covered words, or a length of a longest sequence of not-covered words. In some implementations, these characteristics can be normalized by source sentence length. In some of these implementations where more characteristics of the languages snippets are extracted, the extracted characteristics can comprise data to compute, as a maximum alignment between language snippets, any one or more of: a total IBM score; a set, such as three, top fertility values; a number of covered words; a maximal number of consequent source words which have corresponding consequent target words; or a maximum number of consequent not-covered words.

The extent to which characteristics are extracted can be based on a source identified with the potential translation pair. For example, some sources can be known to produce potential translation pairs for which a simple analysis is likely to be highly accurate in identifying actual translation pairs. Examples of these types of sources are single content items that contain multiple languages and multiple content items that are generated by the same author in different languages within a timeframe. Other sources of potential translation pairs can be known to produce potential translation pairs which have very similar but not direct translation language snippets, and therefore require a more detailed analysis using additional extracted characteristics. An example of this type of source is multiple content items in different languages that are related to the same or similar target.

At block 608 extracted characteristics are compared to determine whether the potential translation pair received at block 604 is an actual translation pair. As discussed above, this can include a computationally inexpensive analysis, such as one based on a comparison of term translations or using a general machine translation engine, or can be a more expensive analysis using additional extracted characteristics. As also discussed above, in some implementations, the type of analysis performed is based on an identified source of the potential translation pair. If, at block 608, the potential translation pair is determined not to be an actual translation pair, process 600 continues to block 612, where it ends. If, at block 608, the potential translation pair is determined to be an actual translation pair, process 600 continues to block 610, where it returns an identification of the potential translation pair as an actual translation pair. Process 600 then continues to block 612, where it ends.

Figure 7:
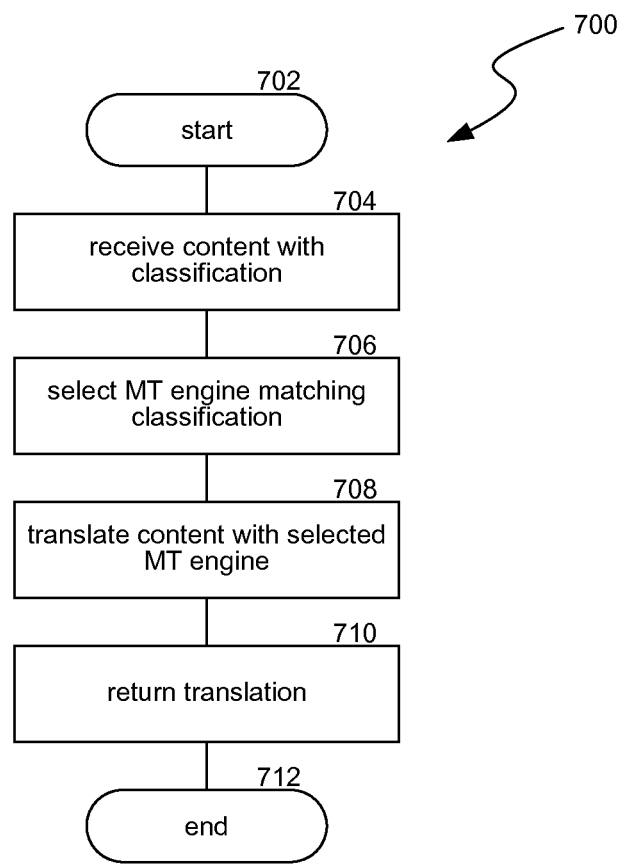
FIG. 7 is a flow diagram illustrating a process used in some embodiments selecting a machine translation engine based on a content item classification.

FIG. 7 is a flow diagram illustrating a process 700 used in some embodiments for selecting a machine translation engine based on a content item classification. Process 700 begins at block 702 and continues to block 704. At block 704 a content item to be translated can be received. In some implementations, the received content item is associated with a classification identifying the domain or subdomain for the content item. A classification for the content item could be based on the terms used in the content item. For example, using the term "blimey" could be an indication of a British classification. The classification could be based on where the content item was posted within a social media site, such as a soccer classification for a post to a professional soccer player's fan page. The classification could be based on who posted the content item, such as a user who has been identified as living in Louisiana is likely to post content items that use Southern American slang, and therefore could be classified as such.

At block 706 a machine translation engine matching the classification of the content item can be selected. In some implementations, machine translation engines are associated with a hierarchy, such as a tree structure, of domains with a most general domain at the root and more specific subdomains further along the structure. For example, a social media domain could be the root of a tree with regions, dialects, topics, etc. at the next level of the tree, and with further subdivisions within each node as the tree is traversed. For example, a content item could have a classification from being a post to a social media fan page for southern Vietnam motorbike enthusiasts. The tree hierarchy could have a root of Social Media, a regions second level node, a Vietnam third level node, a southern fourth level node, and a vehicles fifth level node. In this example, while the tree hierarchy has cars and planes below the fifth level vehicle node, it does not have a motorbike node below the vehicles node. Accordingly the fifth level vehicles node would be the best matching node for the southern Vietnam motorbike enthusiasts content item. A machine translation engine corresponding to the node could be selected at block 706. In some implementations where the content items is not associated with a classification, a default machine translation engine, such as a general machine translation engine or a social media domain machine translation engine, can be selected at block 706 to perform a translation.

At block 708 the content item received at block 704 is translated using the machine translation engine selected at block 706. At block 710 the translation of the content item is returned. Process 700 then continues to block 712, where it ends.

Several embodiments of the disclosed technology are described above in reference to the figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means a determination that a value for an item under comparison is above a specified other value, that an item under comparison is among a certain specified number of items with the largest value, or that an item under comparison has a value within a specified top percentage value. As used herein, being below a threshold means a determination that a value for an item under comparison is below a specified other value, that an item under comparison is among a certain specified number of items with the smallest value, or that an item under comparison has a value within a specified bottom percentage value. As used herein, being within a threshold means a determination that a value for an item under comparison is between two specified other values, that an item under comparison is among a middle specified number of items, or that an item under comparison has a value within a middle specified percentage range.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above, are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method, performed by a computing device, for mining translation pairs for training in-domain machine translation engines, comprising:
    obtaining one or more sources of potential translation pairs comprising one or more content items,
        wherein the one or more sources of potential translation pairs are in an identified domain for which a machine translation engine is to be trained;
    generating one or more potential translation pairs from the obtained one or more sources of potential translation pairs by applying one or more automated filtering techniques to the obtained one or more sources of potential translation pairs,
        wherein one of the one or more automated filtering techniques applied to a selected obtained source of potential translation pairs is configured based on a type of the selected obtained source of potential translation pairs, and
        wherein each of the one or more potential translation pairs comprises at least two language snippets;
    selecting at least one actual translation pair from the generated one or more potential translation pairs, said selecting comprising:
        extracting characteristics from each of the two language snippets of at least one of the one or more potential translation pairs;
        determining that the two language snippets of the at least one of the one or more potential translation pairs are translations of each other by comparing the extracted characteristics; and
    training the machine translation engine using the selected at least one actual translation pair.

2. The method of claim 1, wherein:
    the obtained one or more sources of potential translation pairs comprise single content items that each contain multiple languages;
    each of the at least two language snippets for each potential translation pair is a portion of one of the single content items;
    each of the at least two language snippets for each potential translation pair comprises two or more consecutive words for which a particular language has been identified; and
    the identified domain for which the machine translation engine is to be trained is a social media domain.

3. The method of claim 2, wherein applying the one of the or more automated filtering techniques comprises eliminating from consideration an unlikely potential translation pair of the one or more potential translation pairs by:
    determining a first count of terms in a first of the at least two language snippets of the unlikely potential translation pair;
    determining a second count of terms in a second of the at least two language snippets of the unlikely potential translation pair;
    computing that a ratio of terms between the first count of terms and the second count of terms is beyond a specified threshold value; and
    in response to the computing that the ratio of terms is beyond the specified threshold value, eliminating from consideration the unlikely potential translation pair.

4. The method of claim 1:
    wherein each of the obtained one or more sources of potential translation pairs comprise multiple content items in different languages;
    wherein the multiple content items in different languages of each individual obtained one or more sources of potential translation pairs are related to the same target;
    wherein the at least two language snippets for each potential translation pair are:
        from different ones of the multiple content items of one of the obtained one or more sources of potential translation pairs and are in different languages; and
    wherein the identified domain for which the machine translation engine is to be trained is a social media domain.

5. The method of claim 4, wherein the obtained one or more sources of potential translation pairs comprise multiple content items that are linked to the same social graph node.

6. The method of claim 4, wherein the obtained one or more sources of potential translation pairs comprise multiple content items that contain the same URL target.

7. The method of claim 4, wherein applying the one of the one or more automated filtering techniques comprises eliminating from consideration an unlikely potential translation pair by:
    determining, for each of the multiple content items of the unlikely potential translation pair, a corresponding time indicator specifying when that content item was created or published;
    computing that the determined time indicators are not within a specified time window threshold; and
    in response to computing that the time indicators are not within the specified time window threshold, eliminating from consideration the unlikely potential translation pair.

8. The method of claim 4, wherein applying the one of the one or more automated filtering techniques comprises:
    dividing a first content item of the multiple content items into a first group of sentences;
    dividing a second content item of the multiple content items into a second group of sentences;
    receiving an identification of a particular segment length;

dividing each sentence of the first group of sentences into a third group of consecutive term segments each segment of length no greater than the particular segment length;

dividing each sentence of the second group of sentences into a fourth group of consecutive term segments each segment of length no greater than the identified segment length;

finding at least one segment match between a particular segment of the third group of consecutive term segments and a particular segment of the fourth group of consecutive term segments by determining that a specified threshold number of terms between the particular segment of the third group and the particular segment of the fourth group are translations of each other; and in response to the finding of at least one segment match, generating as the one or more potential translation pairs each permutation of sentence pairs where one sentence of each sentence pair is selected from the first group of sentences and the other sentence of each sentence pair is selected from the second group of sentences.

9. The method of claim 8, wherein the received identification of the particular segment length identifies a segment length of three terms.

10. The method of claim 1:
wherein the obtained one or more sources of potential translation pairs comprise multiple content items that are generated by the same author;
wherein the at least two language snippets for each potential translation pair:
are from different ones of the multiple content items,
are in different languages, and
were published within a time window of each other; and
wherein the identified domain for which the machine translation engine is to be trained is a social media domain.

11. The method of claim 1, wherein applying the one of the one or more automated filtering techniques comprises applying smoothing to at least one of the obtained one or more sources of potential translation pairs by:
identifying one or more language classifications for at least one term in the one or more obtained sources of potential translation pairs as a mistaken classification; and
changing the classification for the at least one term to a language classification of an adjacent term.

12. The method of claim 1, wherein applying the one of the one or more automated filtering techniques comprises:
receiving an identification of one or more desired languages;
for at least one selected language snippet of the at least two language snippets of each potential translation pair, identifying a language for the at least one selected language snippet; and
determining that the identified language for the at least one selected language snippet is one of the one or more desired languages.

13. The method of claim 1, wherein the extracted characteristics comprise data to compute, between the two language snippets, two or more of:
a ratio of a number words;
an IBM score,
maximum fertility,
a number of covered words,
a length of a longest sequence of covered words,
a length of a longest sequence of not-covered words;
a set of three top fertility values;
a maximal number of consequent source words which have corresponding consequent target words; or
a maximum number of consequent not-covered words.

14. The method of claim 1, wherein training the machine translation engine comprises assigning to an in-domain machine translation engine a classification according to a type for sources of translation pairs used to train that machine translation engine.

15. A non-transitory computer-readable medium storing instructions that, when executed by a computing system, cause the computing system to perform operations for mining translation pairs for training in-domain machine translation engines, the operations comprising:
obtaining one or more sources of potential translation pairs comprising one or more content items,
wherein the one or more sources of potential translation pairs are in an identified domain for which a machine translation engine is to be trained;
generating one or more potential translation pairs from the obtained one or more sources of potential translation pairs by applying one or more automated filtering techniques to the obtained one or more sources of potential translation pairs,
wherein one of the one or more automated filtering techniques applied to a selected obtained source of potential translation pairs is configured based on a type of the selected obtained source of potential translation pairs, and
wherein each of the one or more potential translation pairs comprises at least two language snippets;
selecting at least one actual translation pair from the generated one or more potential translation pairs, said selecting comprising:
extracting characteristics from each of the two language snippets of at least one of the one or more potential translation pairs;
determining that the two language snippets of the at least one of the one or more potential translation pairs are translations of each other by comparing the extracted characteristics; and
training the machine translation engine using the selected at least one actual translation pair.

16. The computer-readable medium of claim 15, wherein:
the obtained one or more sources of potential translation pairs comprise single content items that contain multiple languages;
each of the at least two language snippets for each potential translation pair is a portion of one of the single content items;
each of the at least two language snippets for each potential translation pair comprises two or more consecutive words for which a particular language has been identified; and
applying the one of the or more automated filtering techniques comprises eliminating from consideration an unlikely potential translation pair of the one or more potential translation pairs by:
determining a first count of terms in a first of the at least two language snippets of the unlikely potential translation pair;
determining a second count of terms in a second of the at least two language snippets of the unlikely potential translation pair;
computing that a ratio of terms between the first count of terms and the second count of terms is beyond a specified threshold value; and in response to the computing that the ratio of terms is beyond the specified threshold value, eliminating from consideration the unlikely potential translation pair.

17. The computer-readable medium of claim 15:

wherein each of the obtained one or more sources of potential translation pairs comprise multiple content items in different languages;

wherein the multiple content items in different languages of each individual obtained one or more sources of potential translation pairs are related to the same target URL or social graph node; and wherein the at least two language snippets for each potential translation pair are:

from different ones of the multiple content items of one of the obtained one or more sources of potential translation pairs and are in different languages.

18. The computer-readable medium of claim 17, wherein applying the one of the or more automated filtering techniques comprises:

dividing a first content item of the multiple content items into a first group of sentences;

dividing a second content item of the multiple content items into a second group of sentences;

receiving an identification of a particular segment length;

dividing each sentence of the first group of sentences into a third group of consecutive term segments each segment of length no greater than the particular segment length;

dividing each sentence of the second group of sentences into a fourth group of consecutive term segments each segment of length no greater than the identified segment length;

finding at least one segment match between a particular segment of the third group of consecutive term segments and a particular segment of the fourth group of consecutive term segments by determining that a specified threshold number of terms between the particular segment of the third group and the particular segment of the fourth group are translations of each other; and in response to the finding of at least one segment match, generating as the one or more potential translation pairs each permutation of sentence pairs where one sentence of each sentence pair is selected from the first group of sentences and the other sentence of each sentence pair is selected from the second group of sentences.

19. A computing system for mining in-domain translation pairs comprising:

one or more processors;

a memory;

a potential translation pair finder configured to:

obtain one or more sources of potential translation pairs comprising one or more content items, wherein the one or more sources of potential translation pairs are in a identified domain for which a machine translation engine is to be trained; and generate one or more potential translation pairs from the obtained one or more sources of potential translation pairs by applying one or more automated filtering techniques to the obtained one or more sources of potential translation pairs, wherein one of the one or more automated filtering techniques applied to a selected obtained source of potential translation pairs is configured based on a type of the selected obtained source of potential translation pairs, and wherein the one or more potential translation pairs each comprise at least two language snippets; and an actual pair analyzer configured to select at least one actual translation pair from the generated one or more potential translation pairs by extracting characteristics from each of the two language snippets of at least one of the one or more potential translation pairs; and determining that the two language snippets of the at least one of the one or more potential translation pairs are translations of each other by comparing the extracted characteristics.

* * * * *